(12) United States Patent
Vaughn, Jr. et al.

(10) Patent No.: US 8,011,323 B2
(45) Date of Patent: Sep. 6, 2011

(54) TOP-FILL HUMMINGBIRD FEEDER WITH TWIST BOTTLE VALVE

(75) Inventors: William R. Vaughn, Jr., Lititz, PA (US); Christopher J. Kamery, Lancaster, PA (US); Robert Theodore Cruz, Lititz, PA (US); Andrew Gauker, Shillingon, PA (US)

(73) Assignee: Woodstream Corporation, Lititz, PA (US)

( * ) Notice: Subject to any disclaimer, the term of this patent is extended or adjusted under 35 U.S.C. 154(b) by 12 days.

(21) Appl. No.: 12/382,848

(22) Filed: Mar. 25, 2009

(65) Prior Publication Data

US 2010/0242848 A1   Sep. 30, 2010

(51) Int. Cl.
    *A01K 39/02*   (2006.01)
(52) U.S. Cl. .......................................... 119/72
(58) Field of Classification Search ............ 119/72, 119/74, 77, 57.8, 52.2, 73
    See application file for complete search history.

(56) References Cited

U.S. PATENT DOCUMENTS

| | | | | |
|---|---|---|---|---|
| 2,866,435 A * | 12/1958 | Blazier | ............ | 119/53 |
| 3,913,527 A * | 10/1975 | Kilham | ............ | 119/74 |
| 4,732,112 A * | 3/1988 | Fenner et al. | ............ | 119/52.2 |
| 5,303,674 A * | 4/1994 | Hyde, Jr. | ............ | 119/77 |
| 5,493,999 A * | 2/1996 | Schenck | ............ | 119/72 |
| 5,634,429 A * | 6/1997 | Loomis et al. | ............ | 119/52.2 |
| 7,600,487 B2 * | 10/2009 | Stone et al. | ............ | 119/72 |
| 7,685,969 B2 * | 3/2010 | Stone et al. | ............ | 119/72 |
| 2009/0320765 A1 * | 12/2009 | Gauker et al. | ............ | 119/75 |

* cited by examiner

*Primary Examiner* — Rob Swiatek
*Assistant Examiner* — Ebony Evans
(74) *Attorney, Agent, or Firm* — Jacobson Holman PLLC (57) ABSTRACT

A liquid bird feeder provides a liquid container having a sealable top opening and a bottleneck extension at its other end, and a liquid tray having a well adapted to receive the bottleneck extension and at least one feeding port. The sidewall of the well is provided with at least one drain hole and the sidewall of the bottleneck extension with at least one port. The container and bottleneck extension are rotatable within the well to selectively align and misalign the port with the well drain hole to respectively open and close the drain hole upon rotation of the container. In an alternate embodiment, the bottleneck extension is fitted with a collar rotatable with the container. The collar is received in the liquid tray well and includes the at least one port. A liquid flow path is formed in the liquid tray for each feeding port to reduce the volume of nectar in the tray at any given time.

22 Claims, 6 Drawing Sheets

FIG. 1

Prior Art

TOP-FILL HUMMINGBIRD FEEDER WITH TWIST BOTTLE VALVE

BACKGROUND OF THE INVENTION

1. Field of the Invention

The present invention is related to the field of liquid bird feeders and, more particularly, to a top-fill hummingbird feeder.

2. Description of the Related Art

People who live in an area inhabited by hummingbirds frequently try to promote their presence by the use of hummingbird feeders. Hummingbird feeders differ from ordinary bird feeders because hummingbirds feed on nectar or simulated nectar, which are liquid, instead of the dry food consumed by most birds. Simulated nectar is typically formed from water sweetened with sugar or honey. In many hummingbird feeders, the nectar (or simulated nectar) is stored in a reservoir and conveyed to simulated flowers where a perch may be provided so that the hummingbird can land and, having a long, slender beak, insert it into the access apertures in the simulated flower and feed.

Most hummingbird feeders have one of two basic designs. One includes an inverted top container which empties into a lower reservoir or feeding basin from which the birds feed. The vacuum at the top of the container (or put another way, the outside air pressure) keeps the liquid in the top container from draining out too rapidly. The other common feeder design consists of a container with holes in its cover through which the hummingbirds reach to feed. This latter style of feeder suffers from the problem that it must be refilled very often, because the level of food is constantly being reduced by the feeding.

The so-called "vacuum-type" feeders also have problems. For example, they can only be filled by dismantling the feeder and removing the top container from its feeding position. Ordinarily, the consumer must invert the feeder in order to refill it, with the attendant risks of spillage, and requires a certain amount of manual dexterity to create the necessary vacuum. Moreover, because a vacuum is required, these designs are limited to a single opening for filling and cleaning. This opening is typically small, which restricts access to the interior of the container and makes it more difficult to effectively clean the container. Additionally, vacuum feeders can corrode or be inefficient, permitting the nectar to leak and creating an increased risk of insect contamination.

One product which has been available in the market is the Garden Song Top Fill Hummingbird Feeder from Opus Incorporated. The Opus feeder includes an upstanding liquid container with a large top opening and a small cylindrical lower opening which is screw-threaded into an upstanding cylindrical collar positioned in the center of a feeding basin or liquid tray. The top opening is closed with a cover that seals the container to create a vacuum as the liquid level recedes downwardly in the container. An internal, rotatable ring or valve mechanism has an upstanding cylindrical wall which surrounds the cylindrical collar inside the feeding basin.

The wall of the cylindrical collar has a plurality of ports, and the cylindrical wall of the rotatable ring has a plurality of corresponding openings. When the openings in the rotatable ring are aligned with the ports of the collar using an externally accessible lever, nectar can flow out of the container lower opening, through the aligned ports and openings, and into the feeding basin or liquid tray. When the rotatable ring is rotated using the externally accessible lever, so that its openings are not aligned with the ports of the collar, the nectar flow from the container to the feeding base is cut off. In this condition, the cover can be removed from the container top opening for (re)filling the container without nectar in the container flowing out through the collar to flood and overflow the feeding base or liquid tray. This design also permits the top opening to be large enough to facilitate easy cleaning of the bottle. This feeder is described in co-pending U.S. application Ser. No. 11/434,020, which is hereby expressly incorporated herein by reference.

There have also been modular designs for hummingbird feeders in which a common functional feeding module is utilized in conjunction with changeable decorative outer claddings. However, such prior art hummingbird modular feeders suffer the same drawbacks as discussed above.

SUMMARY OF THE INVENTION

In view of the foregoing, the present invention is directed to a liquid bird feeder having a liquid container with a sealable top opening and a bottom opening in a lower end thereof, a liquid feeding basin adapted to immerse the bottom opening in liquid, and a valve or sealing mechanism adapted to close the bottom opening to enable the liquid container to be filled through the sealable top opening.

The lower end of the liquid container includes a vertically oriented cylindrical extension shaped like a bottleneck and having an opening therein. The liquid feeding basin includes a vertically oriented cylindrical well adapted to connect to the cylindrical bottleneck extension of the liquid container. The cylindrical well includes a cylindrical side wall having a liquid port located therethrough.

According to a first embodiment, the bottleneck extension received in the cylindrical well of the feeding basin is closed at its end. The valve mechanism is formed by at least one drain hole formed in the side wall of the bottleneck at the lower end of the container, and at least one port in the cylindrical side wall of the feeding basin well. As the container is rotated clockwise or counterclockwise, the drain hole aligns or misaligns with the port in the well of the feeding basin to allow or block fluid flow from the container into the basin, respectively. The side wall of the bottleneck of the container may include a plurality of drain holes adapted to simultaneously align or misalign with a corresponding plurality of ports in the feeding basin well for respectively opening and closing all of the plurality of ports simultaneously upon rotation of the container.

According to a second embodiment, the bottleneck extension received in the cylindrical well of the feeding basin is open at its end. The cylindrical well in the feeding basin in adapted to receive a cylindrical collar having internal threads. The collar is connected to the cylindrical bottleneck extension of the liquid container by screwing the bottleneck into the collar to a tightened position so that the collar is rotatable with the container. Each of the collar and the cylindrical well includes a respective cylindrical side wall, the collar side wall having at least one liquid port and the well side wall having at least one drain hole located therethrough.

The valve mechanism according to the second embodiment is embodied by the collar as tightened into engagement with the bottleneck so as to rotate therewith, in cooperation with the cylindrical well formed in the basin. The port or ports in the side wall of the collar are adapted to selectively align and misalign with a corresponding number of drain holes in the side wall of the well of the feeding basin to form one or more set of paired apertures. Each set of paired apertures defines a nectar flow path from the container into the basin. The container with the collar affixed thereto is preferably rotatable clockwise and counterclockwise through an angle of rotation, preferably about 60 degrees, to respectively open and close the nectar flow paths by aligning and misaligning the paired apertures.

Accordingly, it is an object of the present invention to provide a reliable, consumer-friendly hummingbird feeder having a liquid-holding container or bottle with a large open top for easy top filling and cleaning of the container.

Another object of the present invention is to provide a hummingbird feeder in which the liquid-holding container does not have to be inverted after filling in order to create a vacuum to control flow of the liquid nectar to the feeding basin.

A further object of the present invention is to provide a hummingbird feeder with a liquid-holding container having a bottleneck extension at its lower end that according to a first embodiment is received within an upstanding cylindrical well formed on the base of the feeding basin and that is configured for rotational movement relative to the well.

Still another object of the present invention is to provide a hummingbird feeder in accordance with the preceding object in which the bottleneck extension at the lower end of the container has a side wall with a plurality of drain holes therein that, as the container is rotated clockwise or counterclockwise, align or misalign with corresponding ports or outlets in the cylindrical well of the feeding basin to respectively allow or prevent fluid flow into the basin, respectively.

Yet another object of the present invention is to provide a hummingbird feeder with a liquid-holding container having a bottleneck extension at its lower end that according to a second embodiment has a separate collar attached thereto. The bottleneck with the attached collar is received as a unit within an upstanding well formed in the base of the feeding basin and is configured for rotational movement as a unit relative to the feeding basin.

Another object of the present invention is to provide a hummingbird feeder in accordance with the preceding object in which the collar has a plurality of liquid ports that align and misalign with a corresponding plurality of drain holes in the basin well to form sets of paired apertures as the container and collar unit is rotated clockwise and counterclockwise relative to the well.

An additional object of the present invention is to provide a hummingbird feeder in accordance with the preceding objects which has components that can be easily manufactured from readily available and known materials and that can be easily assembled and disassembled for easy cleaning and will be sturdy and long lasting in operation.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
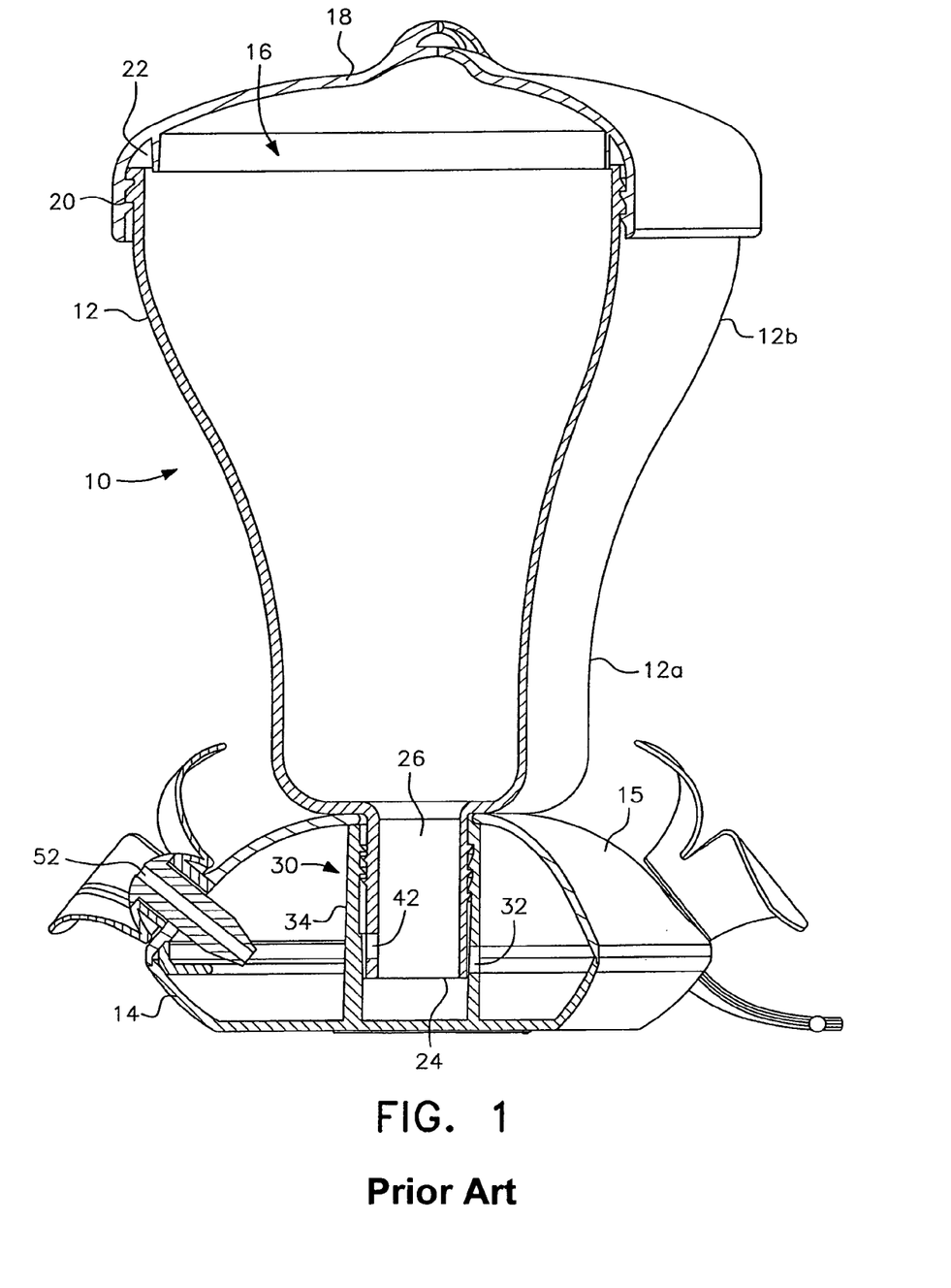
FIG. 1 is a sectional side view of a bird feeder constructed in accordance with a first embodiment of the present invention.

FIG. 1 generally shows a sectional side view of a bird feeder 10, which generally includes a reservoir or liquid container 12 and a feeding basin 14. Liquid container 12 includes a sealable top opening 16 having a cover 18 adapted to seal the top opening 16. The cover 18 includes peripheral threads 20 adapted to engage the liquid container 12 and an O-ring seal 22 located to create an airtight seal.

Liquid container 12 includes a bottom end opening 24 formed by a bottleneck extension 26 of the lower end 12a of liquid container 12. Bottom end opening 24 and feeding basin 14 are oriented to immerse bottom end opening 24 in liquid from liquid container 12. This arrangement allows a vacuum created in the upper end 12b of liquid container 12 to retain liquid therein and automatically feed liquid into feeding basin 14 to the level of the bottom end opening 24.

Feeding basin 14 includes a vertically oriented, cylindrical well 30, which extends upwardly and is adapted to engage cylindrical extension 26 of liquid container 12. Cylindrical well 30 is axially closed at its lower end by formation with feeding basin 14, but includes one or more drain holes 32 formed in the cylindrical side wall 34.

Feeding basin 14 further includes a cover 15 adapted to substantially close feeding basin 14 and limit access to any liquid contents thereof. Cover 15 includes a plurality of bird feeder ports 52 adapted to allow access by long-beaked hummingbirds while simultaneously preventing access by bees.

Figure 2:
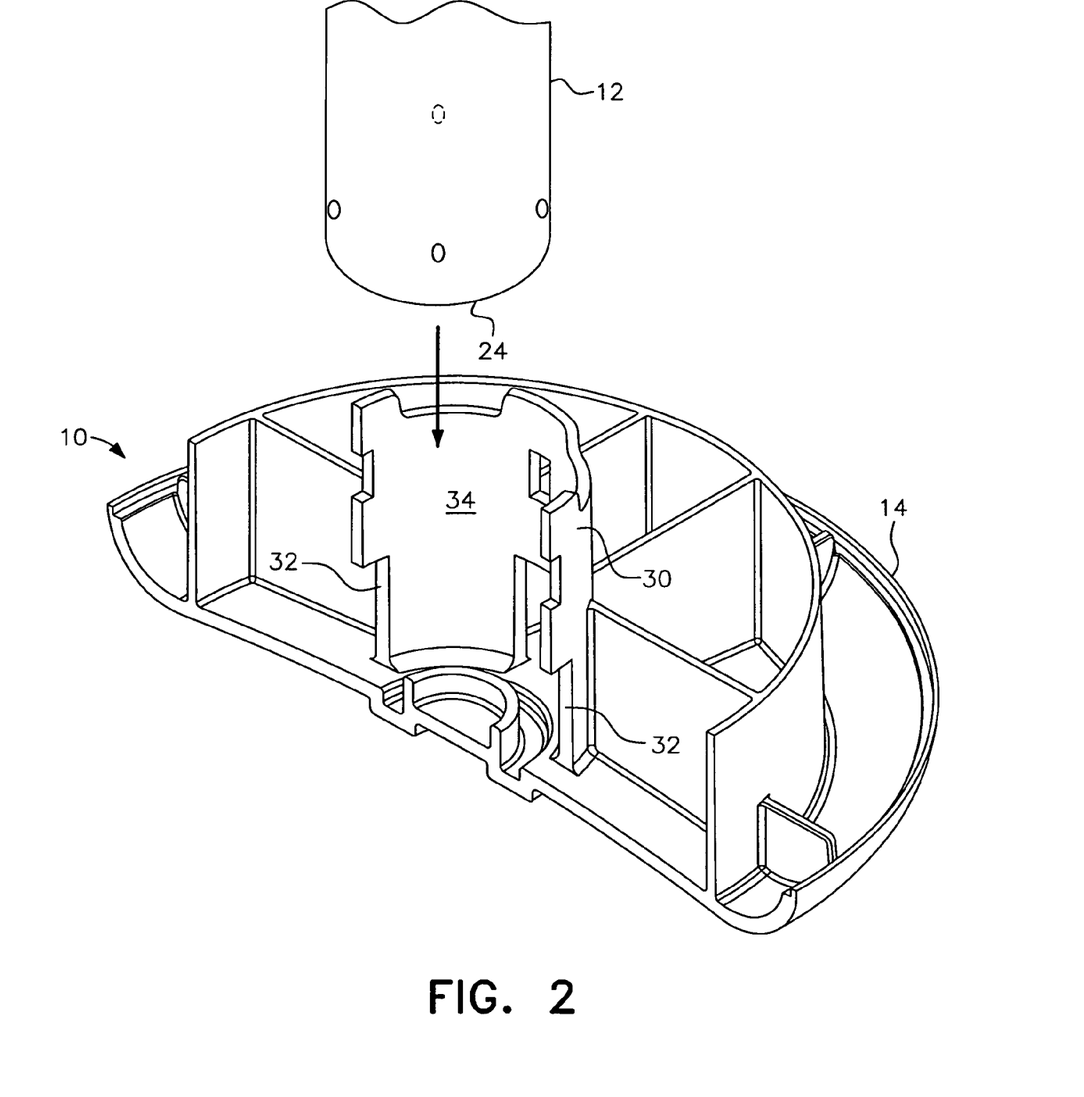
FIG. 2 is a perspective sectional view of the bird feeder of FIG. 1, shown with the valve mechanism in a closed position.
Figure 3:
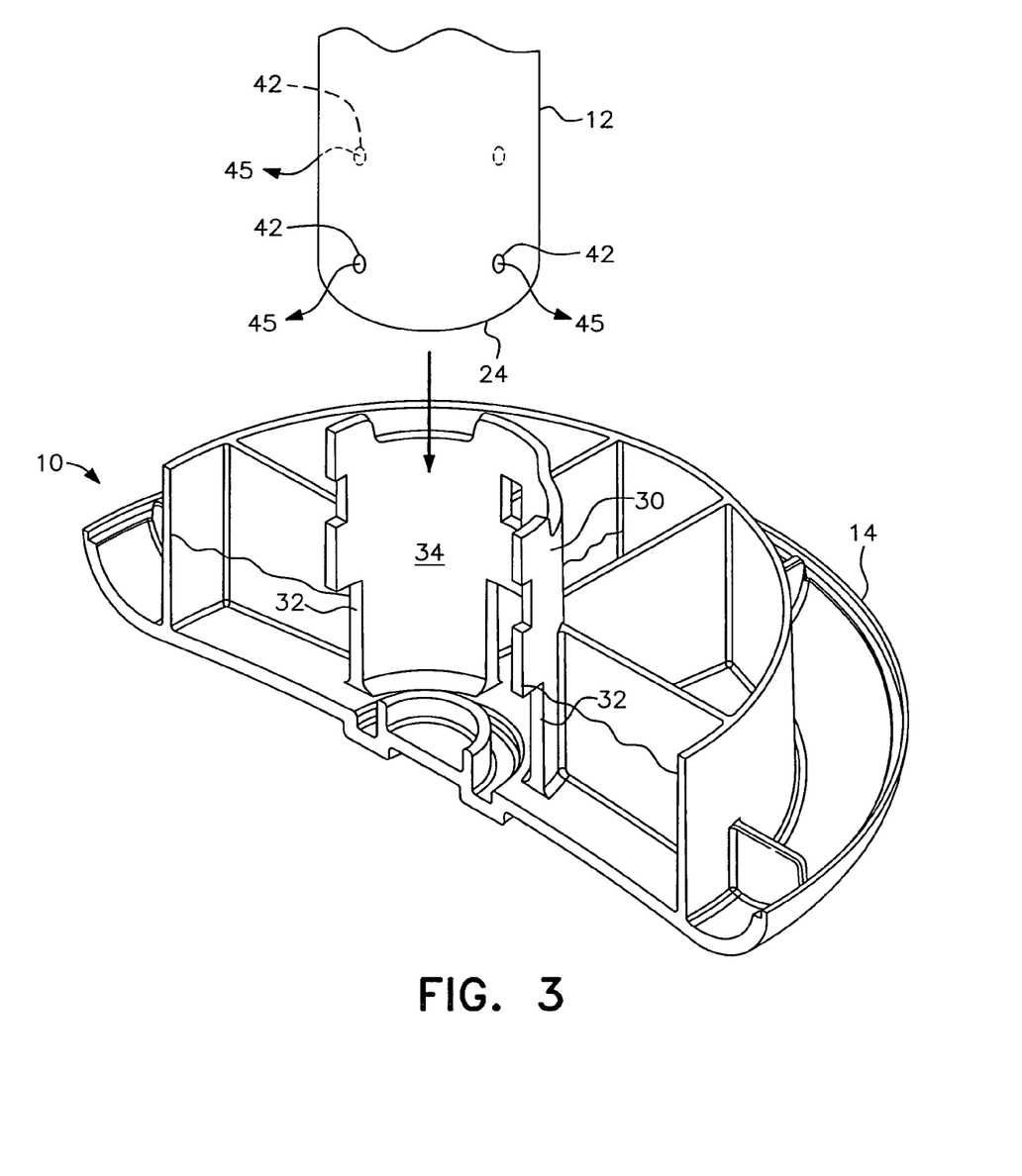
FIG. 3 is a perspective sectional view of the bird feeder of FIG. 1, shown with the valve mechanism in an open position.

According to the first embodiment of the bird feeder 10 shown in FIGS. 1-3, the lower end 12a of the liquid-holding container has a bottleneck extension 26 that is closed at the bottom 24. The bottleneck extension 26 is adapted to be rotatably received in a generally vertical orientation within the upstanding cylindrical well 30 formed on the base of the feeding basin 14.

The well 30 on the feeding basin 14 has a cylindrical side wall 34 with at least one drain hole 32 therein in fluid communication with the liquid holding area of the feeding basin 14. The bottleneck extension 26 at the lower end 12a of the container 12 also has at least one port 42 formed in a side wall thereof. By rotating the container 12 clockwise or counterclockwise in its vertical orientation relative to the feeding basin 14, the port 42 can be made to align or misalign with the drain hole 32 in the feeding basin well 30 to allow or prevent fluid flow from the container into the basin, respectively.

Ports 42 in the side wall of the bottleneck extension 26 and drain holes 32 in the feeding basin 14 are oriented so that the ports 42 are immersed in liquid from the container 12 when the feeder is in use. This arrangement allows a vacuum created in the upper end 12b of the container 12 to retain liquid therein, while automatically feeding additional liquid nectar into the feeding basin 14 to bring the level up to cover the ports 42 as birds access the feeder.

The bottleneck extension 26 of the container 12 is preferably provided with a plurality of ports 42 that can be brought into and out of alignment with a corresponding plurality of drain holes 32 in the feeding basin well 30. When the ports and drain holes are misaligned, as shown in FIG. 2, the feeder is in a closed position such that additional fluid nectar is not allowed to flow from the container into the feeding basin. Conversely, when the ports and drain holes are aligned, as shown in FIG. 3, the feeder is in an open position that allows the fluid nectar to flow from the container into the feeding basin as indicated by arrows 45. Once the desired fill level is reached, i.e., the ports are immersed in nectar, the vacuum seal in the top of the container prevents fluid in the feeding basin from flowing out through the feed ports.

Figure 4:
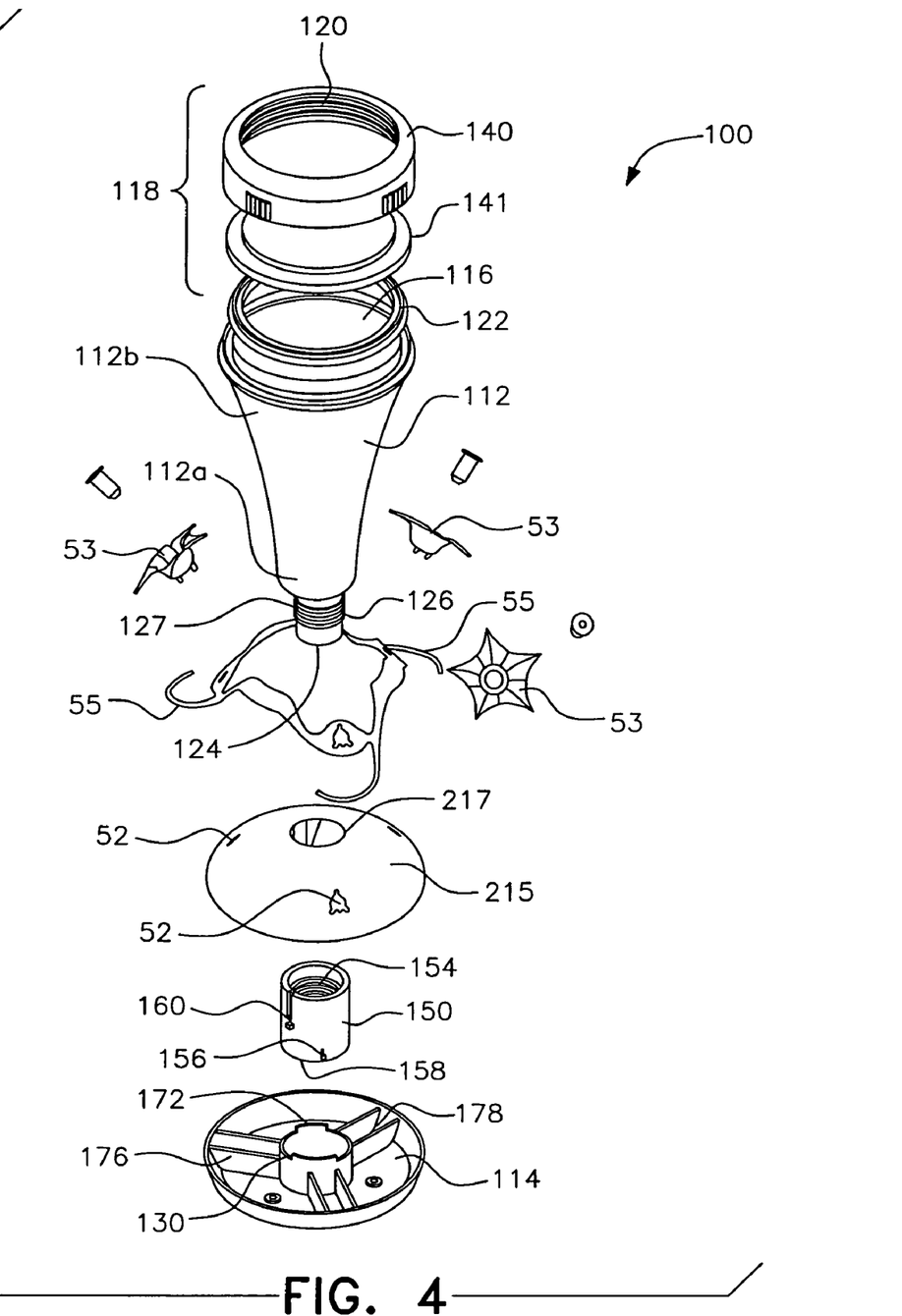
FIG. 4 is an exploded perspective view of a bird feeder constructed in accordance with a second embodiment of the present invention.
Figure 5:
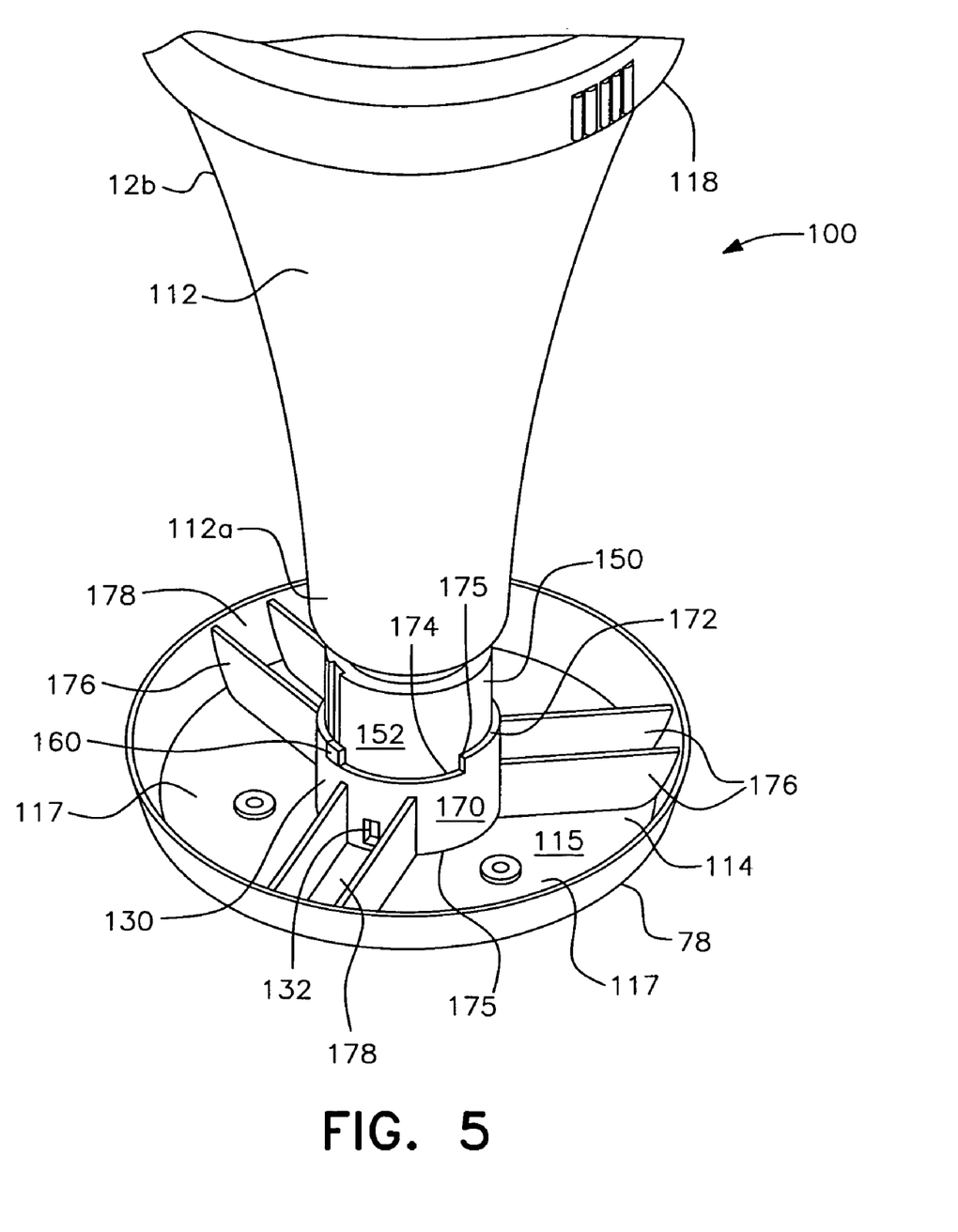
FIG. 5 is an enlarged perspective view of the bird feeder of FIG. 4, with the basin cover removed, shown with the valve mechanism in a closed position.
Figure 6:
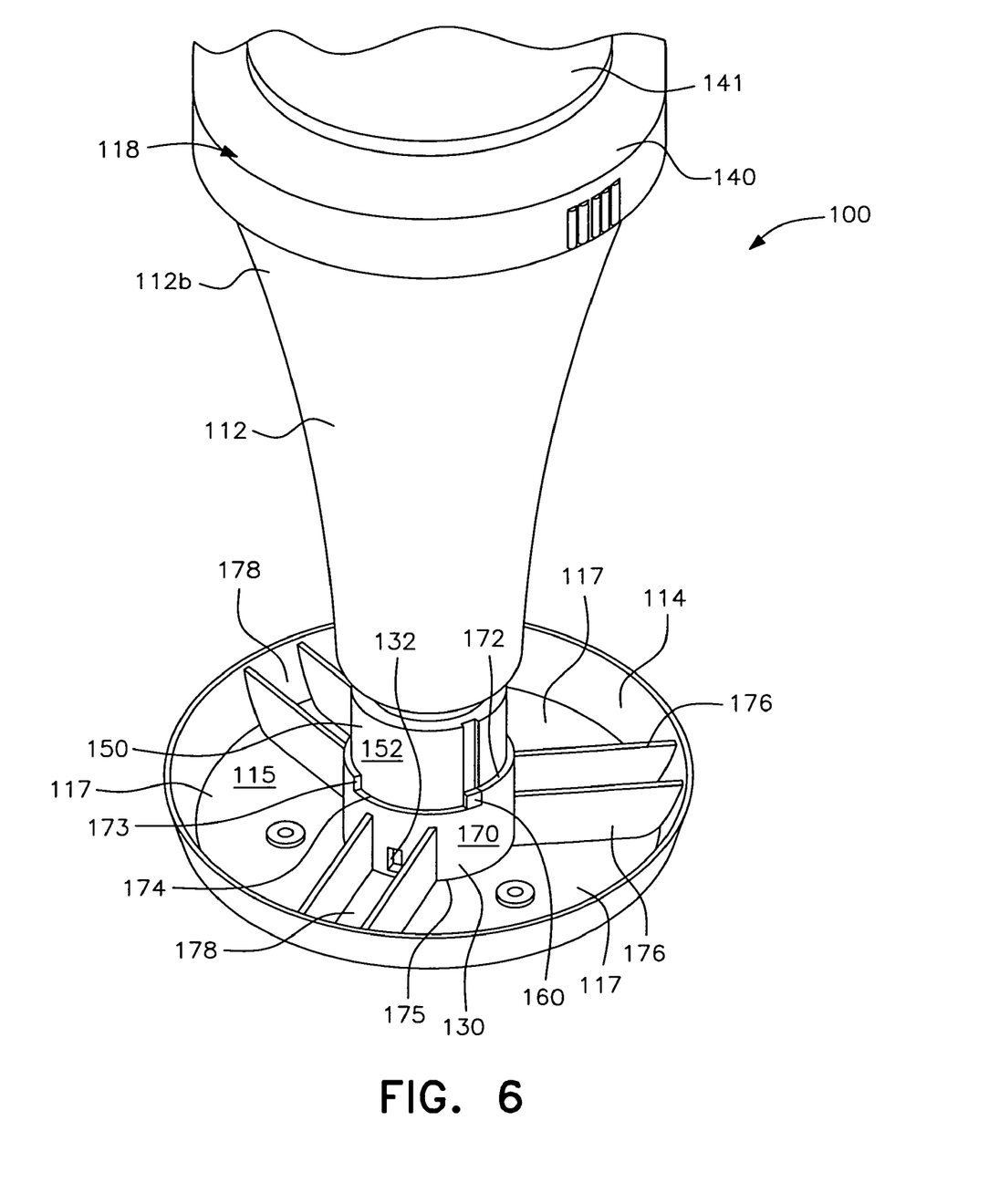
FIG. 6 is an enlarged perspective view of the bird feeder of FIG. 4, with the basin cover removed, shown with the valve mechanism in an open position.

A bird feeder 100 with an alternate valve mechanism according to a second embodiment of the present invention is shown in FIGS. 4-6. In the second embodiment, the lower end 112a of the liquid-holding container 112 has a bottleneck extension 126 that is open at the bottom 124 and that is provided with external threads 127. The upper end 112b of the container has a sealable top opening 116 with a cover 118 adapted to seal the top opening 116. The cover 118 includes peripheral threads 120 adapted to engage the liquid container 112 and an o-ring seal 122 located to created an airtight seal. The cover 118 can be formed as a single piece, or may include a separate rim 140 and insert 141 as shown in FIG. 4.

The valve mechanism includes a separate cylindrical collar 150 having a substantially smooth outer wall 152 and internal threads 154 to engage with the external threads 127 on the bottleneck extension 126. When the collar 150 is threadedly engaged with and tightened onto the bottleneck 126, the bottleneck and collar are rotatable as a unit relative to the feeding basin 114. A single projection or stop 160 is formed on the outer wall 152 of the collar 150 which cooperates to define the range of motion of both the collar and the bottleneck to which it is secured as described hereinafter. A plurality of ports 156 are formed in spaced relationship around the collar 150 adjacent a bottom edge 158 thereof. When the collar is secured to the container 112 for rotation therewith, these ports 156 are positioned below the bottom 124 of the bottleneck extension 126 and therefore are not obstructed by the bottleneck extension.

The bottleneck extension 126 and collar 150 are adapted to be rotatably received in a generally vertical orientation within an upstanding cylindrical well 130 formed on the bottom 115 of the feeding basin 114. The upwardly extending well 130 is preferably integrally molded with the basin bottom 115, but it can be formed separately and then attached to the bottom 115 in any manner known by persons of ordinary skill in the art to be suitable for sealingly joining plastic parts.

The feeding basin 114 is preferably circular with a curved, upwardly directed base wall 78, and the well 130 is preferably located centrally therein. The well 130 has a cylindrical side wall 170 with an upper edge 172 having a cutout 174 formed therein that receives the stop 160 formed on the collar outer wall 152. The cutout 174 preferably extends around about sixty degrees of the upper edge 172 to define a range of movement through which the stop 160, and thus the container and the collar, may be rotated. A plurality of drain holes 132 are formed adjacent the bottom edge 175 of the well side wall 170 in spaced relationship to one another around the cylindrical well 130.

Projecting outwardly from the well side wall 170 and in sealing engagement with the bottom 115 of the basin 114 are a plurality of radially extending walls 176. The walls 176 are arranged in pairs with each pair forming a respective fluid channel 178 therebetween. Each fluid channel 178 is aligned and in fluid engagement with a respective drain hole 132 formed in the well sidewall 170. In this manner, nectar flowing from the container into the basin 114 is contained within the fluid channels 178 which have a smaller fluid holding capacity than that represented by the total volume of the overall feeding basin. Segmented portions 117 of the bottom 115 on either side of each of the fluid channels 178, by contrast, are not filled with nectar. The fluid channels 178 allow a minimal amount or volume of nectar to be dispensed from the container while still bringing the nectar level into close proximity with the feeding ports. As the container minimizes the nectar's exposure to air and other contaminants introduced through the feeding ports, reducing the dispensed volume of nectar keeps the nectar fresher for a longer period of time.

As shown, the feeding basin 114 further includes a cover 215 adapted to substantially close feeding basin 114 and limit access to any liquid contents thereof. Cover 215 includes a top opening 217 through which the bottleneck extension 126 of the container extends. The cover 215 also includes a plurality of bird feeder ports 52 with ornamental features such as simulated flowers 53 adapted to attract and allow access by long-beaked hummingbirds while simultaneously preventing access by bees. Perches 55 may also be provided as part of the cover and feeding basin assembly. The feeding basin 114 and cover 215 may be molded of suitable polymer material. When the feeder is assembled, the cover 215 and the base 114 are sealingly coupled to one another, such as by a threaded engagement or other known connecting mechanism, and the feeding ports 52 are each aligned above their respective fluid channels 178 to enable feeding hummingbirds to access the nectar therein.

Securing of the cover 215 to the feeding basin 114 traps the collar therebetween so as to vertically hold the collar in its position inside the well while yet allowing rotational movement therein. The cover 215 may be secured to the feeding basin by screws, threaded engagement, a snap fit, or other known method of attachment.

To assemble the feeder 100, the collar 150 is positioned in the well 130 with the stop 160 being received in the cutout 174, and the cover 215 is secured to the feeding basin 114 to thereby enclose the collar. The bottleneck extension 126 is then inserted through top opening 117 and, once the stop 160 has come into abutment with the clockwise-most edge 173 of the cutout 174, the bottleneck extension 126 of the container 112 is screwed clockwise into the collar 150 until tight. Once tightened, the container 112 and collar 150 may be rotated together as a unit, counter-clockwise and then clockwise in a back and forth rotation, through the range of rotational movement allowed by the stop in cooperation with the cutout. By rotating the container 112 and collar 150 clockwise or counterclockwise in a vertical orientation relative to the feeding basin 114 and cover 215 in this manner, the ports 156 can be made to align (FIG. 6) or misalign (FIG. 5) with the drain holes 132 in the feeding basin well 130 to allow or prevent, respectively, fluid flow from the container into the fluid channels 178 of the basin. According to the preferred embodiment shown, the container is configured to rotate about 60 degrees clockwise to reach the open position and then back about 60 degrees counter-clockwise to reach the closed position. Other degrees of rotation could be utilized without departing from this invention.

To remove the container from the basin 114, the container 112 is rotated counter-clockwise until the counter-clockwise-most edge 175 of the cutout 174 is contacted by the stop 160. In this position, continued rotational force applied on the container causes the bottleneck extension 126 to be unscrewed from the collar 150. Once the container is removed, cleaning of the feeder is facilitated.

The ports 156 in the side wall of the collar and the drain holes 132 in the feeding basin well are oriented so as to be immersed in liquid from the container 112 when the feeder is in use. This arrangement allows a vacuum created in the upper end 112b of the container 112 to retain liquid therein, while automatically feeding additional liquid nectar into the feeding basin 114 to bring the level in the fluid channels 178 up to cover the ports 156 and aligned drain holes 132 as birds access the feeder.

FIG. 5 illustrates the feeder 100 when the ports 156 and drain holes 132 are misaligned, placing the feeder in a closed position. In the closed position, additional fluid nectar is not allowed to flow from the container into the fluid channels 178 in the feeding basin. Conversely, when the ports 156 drain holes 132 are aligned as paired apertures, as shown in FIG. 6, the feeder is in an open position that allows the fluid nectar to flow from the container into the feeding basin. Once the desired fill level is reached, i.e., once the drain holes are immersed in nectar, the vacuum seal in the top of the container prevents fluid in the fluid channels from flowing out through the feed ports. The unique construction of the bird feeder in accordance with the present invention thus allows top-filling thereof without undesired dripping or spillage of liquid nectar.

The foregoing descriptions and drawings should be considered as illustrative only of the principles of the invention. The invention may be configured in a variety of shapes and sizes and is not limited by the configurations of the preferred embodiments. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A top-fill liquid hummingbird feeder, comprising:
a liquid container for receiving hummingbird nectar having a sealable top opening and a bottleneck extension with an open bottom;
a cylindrical collar adapted to receive and be secured to said bottleneck extension so as to be rotatable therewith, said collar having a sidewall with a stop and a liquid port;
a liquid tray including a cylindrical well adapted to receive said collar, said well having a sidewall with a liquid drain hole and a cutout located therein;
at least one feeding port in communication with the liquid tray; and
said collar with said container secured thereto being rotatable within said well to selectively align and misalign said collar port with said well drain hole to respectively open and close said drain hole and a corresponding liquid flow path from said container into said liquid tray upon rotation of said container clockwise and counter-clockwise, said collar stop cooperating with said well cutout to define a range of said rotational movement, closure of said drain hole enabling said liquid container to be filled with nectar through said sealable top opening and opening of said drain hole enabling liquid nectar to flow from said container into said liquid tray.

2. The top-fill feeder of claim 1, wherein said well extends upwardly in a generally vertical direction with said collar positioned therein, said bottleneck extension being received within said collar in a generally vertical orientation and rotatable in said well clockwise and counter-clockwise around a generally vertical axis.

3. The top-fill feeder of claim 1, wherein said cutout is formed in an upper edge of said well sidewall.

4. The top-fill feeder of claim 1, wherein the range of said rotational movement is about sixty degrees.

5. The top-fill feeder of claim 1, wherein said liquid flow path is defined by a pair of walls extending in spaced relationship from said drain hole to an outer rim of said liquid tray, said liquid flow path confining the nectar and being in liquid communication with said feeding port.

6. The top-fill feeder of claim 1, wherein said cylindrical well includes a plurality of drain holes and said collar sidewall includes a corresponding plurality of ports that are adapted to simultaneously align and misalign with said plurality of drain holes as paired apertures for respectively opening and closing all of said plurality of drain holes simultaneously upon rotation of said liquid container around said vertical axis.

7. The top-fill feeder of claim 6, wherein each of said paired apertures aligns with a respective liquid flow path, each liquid flow path being defined by a pair of walls extending in spaced relationship from a respective drain hole to an outer rim of said liquid tray, said liquid flow paths confining the nectar and being in liquid communication with a corresponding plurality of feeding ports, respectively.

8. The top-fill feeder of claim 1, wherein said feeding basin is oriented to immerse said container open bottom in liquid from said liquid container, creating a vacuum in an upper portion of said container to retain the nectar therein.

9. A top-fill liquid hummingbird feeder, comprising:
a liquid container having a sealable top opening and a bottom portion with a bottom opening, said bottom portion formed as a bottleneck cylindrical extension;
a cylindrical collar configured to receive and be secured to said bottleneck extension so that, when said collar is secured to said bottleneck extension, said collar and said container rotate together, said collar having a sidewall with a liquid port therein;
a liquid tray adapted to immerse said bottom opening in liquid, said tray including a vertically oriented cylindrical well configured to receive said cylindrical extension of said liquid container in a generally vertical orientation, said cylindrical well being axially closed at a lower end thereof by said liquid tray and having a vertically oriented cylindrical sidewall with a drain hole located therein;
at least one feeding port assembly in communication with said liquid tray; and
said cylindrical extension and collar rotating together within said well to selectively align and misalign said liquid port with said drain hole in said cylindrical well sidewall to respectively open and close said drain hole upon rotation of said liquid container clockwise and counterclockwise around a vertical axis, closure of said drain hole enabling the liquid container to be filled with nectar through said sealable top opening while preventing nectar from flowing into said liquid tray, and opening of said drain hole enabling liquid nectar to flow from said container into said liquid tray.

10. The top-fill feeder of claim 9, wherein said drain hole is in communication with a liquid flow path defined by a pair of walls extending in spaced relationship from said drain hole to an outer rim of said liquid tray, said liquid flow path confining the nectar and being in liquid communication with said feeding port assembly.

11. The top-fill feeder of claim 9, wherein said collar is in threaded engagement with said cylindrical extension.

12. The top-fill feeder of claim 11, wherein said cylindrical well includes a plurality of drain holes and said collar includes a corresponding plurality of ports that are adapted to simultaneously align and misalign with said plurality of drain holes as paired apertures for respectively opening and closing a corresponding plurality of liquid flow paths simultaneously upon rotation of said liquid container and collar around said vertical axis.

13. The top-fill feeder of claim 12, wherein each of said paired apertures aligns with a respective liquid flow path, each liquid flow path being defined by a pair of walls extending in spaced relationship from a respective drain hole to an outer rim of said liquid tray, said liquid flow paths confining the nectar and being in liquid communication with a corresponding plurality of feeding port assemblies, respectively.

14. A top-fill liquid hummingbird feeder, comprising:
- a liquid container having a sealable top opening and a bottom portion with a bottom opening, said bottom portion formed as a bottleneck-shaped cylindrical extension;
- a liquid tray adapted to immerse said bottom opening in liquid, said tray including a vertically oriented cylindrical well adapted to receive said cylindrical extension and having a sidewall with a plurality of drain holes located therein;
- a plurality of feeding port assemblies in communication with said liquid tray, said feeding port assemblies providing hummingbirds with access to nectar contained in said liquid tray;
- a plurality of liquid flow paths respectively formed in said liquid tray between said feeding port assemblies and said drain holes in said well so that each feeding port assembly is in communication with said well through its own associated liquid flow path and drain hole, said liquid flow paths being configured to confine nectar that flows through said drain holes to the feeding port assemblies so that said paths taken together have a fluid holding capacity that is smaller than a total volume of said liquid tray; and
- a sealing mechanism movable between a first position in which said sealing mechanism prevents fluid flow through said drain holes and a second position in which said sealing mechanism allows fluid flow through said drain holes, fluid from said container flowing into and filling all of said liquid flow paths substantially simultaneously when said sealing mechanism is moved to said second position so that nectar is accessible through all of the feeding port assemblies.

15. The top-fill feeder of claim 14, wherein each of said liquid flow paths path is defined by a pair of walls extending in spaced relationship from a respective drain hole to an outer rim of said liquid tray adjacent a respective feeding port assembly.

16. The top-fill feeder of claim 14, wherein said sealing mechanism includes a collar in threaded engagement with said cylindrical extension and rotatable therewith, said collar having a plurality of ports for selective alignment and misalignment with said plurality of drain holes upon rotation of said container with said collar secured thereto.

17. The top-fill feeder of claim 16, wherein said plurality of ports are adapted to simultaneously align and misalign with said plurality of drain holes as paired apertures for respectively opening and closing the corresponding plurality of liquid flow paths simultaneously upon rotation of said liquid container and collar around a vertical axis.

18. The top-fill feeder of claim 14, wherein said well and said sealing mechanism include respective complementary elements that cooperate with one another to define a range of said sealing mechanism movement between said first and second positions.

19. The top-fill feeder of claim 18, wherein said sealing mechanism includes a plurality of ports associated with said cylindrical extension that are selectively aligned and misaligned with said drain holes in said well upon rotation of said liquid container around a vertical axis.

20. The top-fill feeder of claim 19, wherein said sealing mechanism includes a collar in threaded engagement with said cylindrical extension, said plurality of ports being formed in said collar.

21. The top-fill feeder of claim 19, wherein said complementary elements include a cutout and a stop.

22. The top-fill feeder of claim 21, wherein said cutout is formed in said well and said stop is formed on said collar.

* * * * *